United States Patent [19]
Bizzotto

[11] Patent Number: 5,486,339
[45] Date of Patent: Jan. 23, 1996

[54] HIGH-PRESSURE MELAMINE REACTOR

[76] Inventor: Wladimiro Bizzotto, Via Fontanelle 87/A, 36061 Bassano Del Grappa (VI), Italy

[21] Appl. No.: 197,175

[22] Filed: Feb. 16, 1994

[30] Foreign Application Priority Data

Feb. 22, 1993 [IT] Italy .................. VI93A0025

[51] Int. Cl.⁶ .................. B01J 10/00
[52] U.S. Cl. .................. 422/193; 422/200; 422/201; 422/195
[58] Field of Search .................. 422/194–195, 422/198, 200, 201, 193

[56] References Cited

U.S. PATENT DOCUMENTS

| | | | |
|---|---|---|---|
| 2,453,837 | 11/1948 | Fisher et al. .................. | 422/194 |
| 2,632,692 | 3/1953 | Korin et al. .................. | 422/194 X |
| 2,905,537 | 9/1959 | Copenhaver .................. | 422/194 X |
| 3,095,416 | 6/1963 | Crowley et al. . | |
| 3,746,515 | 7/1973 | Friedman .................. | 422/194 X |
| 4,311,671 | 1/1982 | Notman .................. | 422/194 X |
| 4,937,051 | 6/1990 | Graven et al. .................. | 422/194 |

FOREIGN PATENT DOCUMENTS

| | | |
|---|---|---|
| 1285786 | 1/1962 | France . |
| 1483116 | 4/1967 | France . |
| 2378021 | 1/1978 | France . |

Primary Examiner—Timothy M. McMahon
Attorney, Agent, or Firm—Watson, Cole, Grindle & Watson

[57] ABSTRACT

According to the invention the non-catalytic high-pressure process for producing the melamine occurs in one single body having a vertical cylindrical shape divided into three sectors separated by means of diaphragms, each sector communicating with the other two through pipelines separated from one another. The top sector (L) is provided with at least one nozzle (1) for letting in the molten urea, with at least one distributor for the reaction gas (3), with at least one pipe (7) connecting said sector with the bottom reaction sector (R), with at least one valve (15) for extracting the residual gas and for adjusting the operating pressure of the reactor and with at least one exchanger cooling the urea. The bottom sector (R), wherein the reaction of the melamine synthesis occurs, is equipped with at least one element for the distribution (10) of the ammonia, with at least one pipe (7) for feeding the molten urea coming from the top sector, with at least one system (8) for obtaining the thermic energy necessary for the reaction, with at least one opening (110) made in the diaphragm (SR) and separating said bottom sector from the central sector. The central sector (S), wherein the separation of the gaseous products from the liquid phase of the reaction occurs, is provided with at least one pipe (11) for feeding the reaction products, with at least one distributor (12) of the ammonia, with means for keeping the temperature of said sector under control, with at least one opening (210) made in the diaphragm (LS), separating said sector from the top sector through which the reaction gases are transferred to the upper sector, with at least one tube (30) for the outlet of the melamine produced.

9 Claims, 1 Drawing Sheet

HIGH-PRESSURE MELAMINE REACTOR

BACKGROUND OF THE INVENTION

The synthesis process to produce melamine starting from urea is usually carried out in presence of excess $NH_3$, in order to limit the formation of deammonisation products such as melam-melem, and it can be globally expressed with the endothermic reaction:

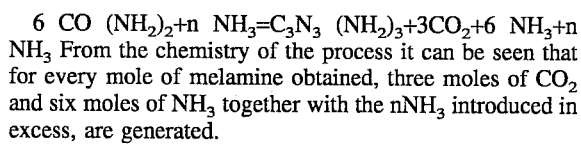

$NH_3$ From the chemistry of the process it can be seen that for every mole of melamine obtained, three moles of $CO_2$ and six moles of $NH_3$ together with the $nNH_3$ introduced in excess, are generated.

The endothermic character of the reaction, industrially carried out at temperatures in the range of 400 C.°, requires the supply of 649 KJ per mole of melamine (starting from molten urea at 135 C.°) usually realized by heat transfer from molten salts circulating in coils or bayonet tubes situated in the reaction zone.

At level of industrial application, the production processes of melamine from urea are usually classified in:

catalytic processes at low-pressure: $p \leq 1$ MPa non-catalytic processes at high-pressure; $p \geq 5$ MPa Reference is made hereinafter to the non-catalytic processes at high-pressure and especially to the process steps required to obtain raw molten melamine and scrubbed reaction off-gas.

The degree of purity of the raw melamine depends on the choices of a series of process parameters such as temperature, pressure, residence time and excess of ammonia, as described for instance in the U.S. Pat. No. 3,484,440 and it is generally over 95%. Following treatments of purification and crystallisation permit to reach purity degrees of $\geq 99.9\%$ as described for instance in the U.S. Pat. No. 3,454,571.

Also the composition of the raw off-gas produced by the reaction, depends on the choice of the above mentioned process parameters.

Such gases, separated from the raw melamine in the liquid phase, contain considerable amounts of melamine, urea and other byproducts as described, for instance, in the U.S. Pat. No. 3,700,672 and quantified in the tables 1 and 2 of the same.

Before recycling them to the urea-plant or before they undergo the process for the recovery of the ammonia they contain, they need to be properly washed for the recovery of the melamine and the urea and for the maximum possible energy recovery.

At present and generally, the high pressure non-catalytic processes, industrially used, start from pressurized molten urea at temperatures comprised between 135° and 160° C., and operate in a pressure range of 5 to 20 MPa and temperature range of 370° to 430° C.

From the point of view of the process design, the plant engineering, equipment and plant operation, the synthesis section of a melamine plant can be schematically subdivided into three steps:

reaction of the urea to melamine separation of the residual gas/ageing of the melamine washing of the residual gas which, with considerable differences in the equipment design and process operating conditions, are performed in specific equipment separated from one another, as is the case in the processes adopted from Allied Chemical, Nissan, MCI and Montecatini (Ausind).

(Ulmann's Encyclopedia of Industrial Chemistry—5th edition)

(Nitrogen N° 139 Sept./Oct. 1982)

The high-pressure process for producing melamine in the liquid phase has also the advantage of yielding the residual gas at high pressure which can be easily recycled in the urea synthesis plant.

It also lends itself, in comparison with the low-pressure catalytic process, to smaller vessels, piping and equipment design but the corrosive behaviour of the processing fluids dictates the use of costly and sophisticated corrosion resistant materials, such as "Hastelloy" and titanium. If, as it happens at present, the mentioned steps of the process are realized industrially step by step in specific equipment, then it is necessary to provide the plant with complex pipeline systems for conveying the processing fluids, with block and control valves, purges and drains, washing systems, jacketing, specific instrumentation, etc. . . . which make the plant complex, difficult to operate, to start-up and to shut-down.

The presence of so many high-pressure pipelines, valves, flanges and fittings, increases, moreover, the risk of plugging of leakages and corrosion of the materials and it affects negatively the safety and the reliability of the plant, the respect of the ecological rules and the quality control of the product.

Such step by step process and plant design approach led to the introduction of specific and itemized improvements of the process and of the equipment design, such those described for instance, in the already mentioned U.S. Pat. Nos. 3,454,571; 3,484,440; 3,700,672.

This implies a complex and sophisticated plant lay-out requiring a series of ancillary equipment and auxiliary utilities with a consequent increase in the investment costs and a probable decrease in the plant utilization factor.

SUMMARY OF THE INVENTION

The purpose of the present invention is to overcome the inconveniences previously mentioned.

More in particular, the main purpose is that of obtaining a reactor for the production of melamine whereby one single cylindrical vessel carries out the three main steps through which the melamine is produced with the non-catalytic, high-pressure process. Therefore, the purpose is that of realizing a single reactor for the production of melamine in which the various processing phases are realized in parts of the reactor being distinct but incorporated in one single body under pressure.

It is also intended to reduce strongly the presence of external pipelines at high-pressure in the melamine-plant and the presence of flanges, valves and fittings, since all of these elements of plant engineering considerably increase the risk of plugging and the reliability of the plant in general.

It is also intended, according to the invention, to reduce strongly the cost of the plant as compared with the equipment being used at present, while limiting also the use, specifically to the internal part of the reactor, of special materials such as titanium and Hastelloy.

All the purposes previously mentioned, and other which will be better pointed out hereinafter, are reached by manufacturing a reactor for the production of melamine, with the non-catalytic high-pressure process, in accordance with the contents of the main claim, said reactor being characterized in that it comprises, in one single body having a vertical cylindrical shape, three sectors separated by means of diaphragms, each sector communicating with the other two through pipelines separated from one another, wherein:

the top sector, where the molten urea is supplied and the reaction gas is washed, is provided with at least one nozzle for the molten urea inlet, with at least one distributor for the reaction gas connected to a duct communicating with the central sector through a hole in the diaphragm, with at least one pipe connecting said sector with the lower sector of reaction, through which the molten urea reaches said reaction sector, with at least one valve for extracting the residual gas and for adjusting the working pressure of the reactor, with a heat exchange system including at least one heat exchanger cooling the urea heated by the reaction gases;

the bottom sector, wherein the chemical reaction of the melamine synthesis occurs in the presence of an excess of ammonia, is equipped with at least one element for the distribution of the gaseous ammonia, said element being connected to an external pipeline, with at least one essentially vertical pipe for feeding the molten urea coming from the top sector, with at least one heat-exchanger for obtaining the heat energy necessary for the endothermic reaction, with at least one opening made in the diaphragm separating said bottom sector from the central sector and feeding the reaction product into the central sector;

the central sector, wherein the separation of the gaseous products from the liquid phase of the reaction occurs, is supplied with at least one pipe for feeding the reaction products coming from the bottom sector, with at least one distributor of the gaseous ammonia, with means for keeping the temperature of said sector under control, with at least one hole made in the diaphragm, separating said sector from the top sector and suited for transferring the reaction gases to the top sector, with at least one tube for the outlet of the melamine produced, said sector being crossed by at least one pipeline connecting the top sector with the bottom sector, each of said sectors presenting in correspondence with its bottom, drain nozzles for recovering the liquids and for the maintenance of said sectors and means for measuring the temperature.

Advantageously according to the invention a new principle is developed for the design of the synthesis section of the melamine plant which incorporates in one single pressure vessel having a vertical cylindrical shape, the above mentioned phases of the process. All the process streams are kept inside the device and gravity, density, differences and lifting by the reaction gases are the driving forces moving the fluids from one to the other of the three sectors forming it.

This new approach to the process requirements and to the plant design eliminates all the disadvantages due to the traditional design, simplifies the plant lay-out, reduces the investment and maintenance costs, makes easier the plant operation and increases the plant on-stream factor. Moreover, it considerably simplifies the start-up and shut-down procedures thus remarkably reducing its stand-still times.

BRIEF DESCRIPTION OF THE DRAWINGS

Further scope of applicability of the present invention will become apparent from the detailed description of the melamine synthesis equipment given hereinafter. However, it should be understood that the detailed description and specific example, while indicating a preferred embodiment of the invention, are given by way of illustration only, since various changes and modifications within the spirit and scope of the invention will become apparent, to those skilled in the art, from this detailed description, and from the drawing, wherein.

DESCRIPTION OF THE PREFERRED EMBODIMENTS

Figure 1:
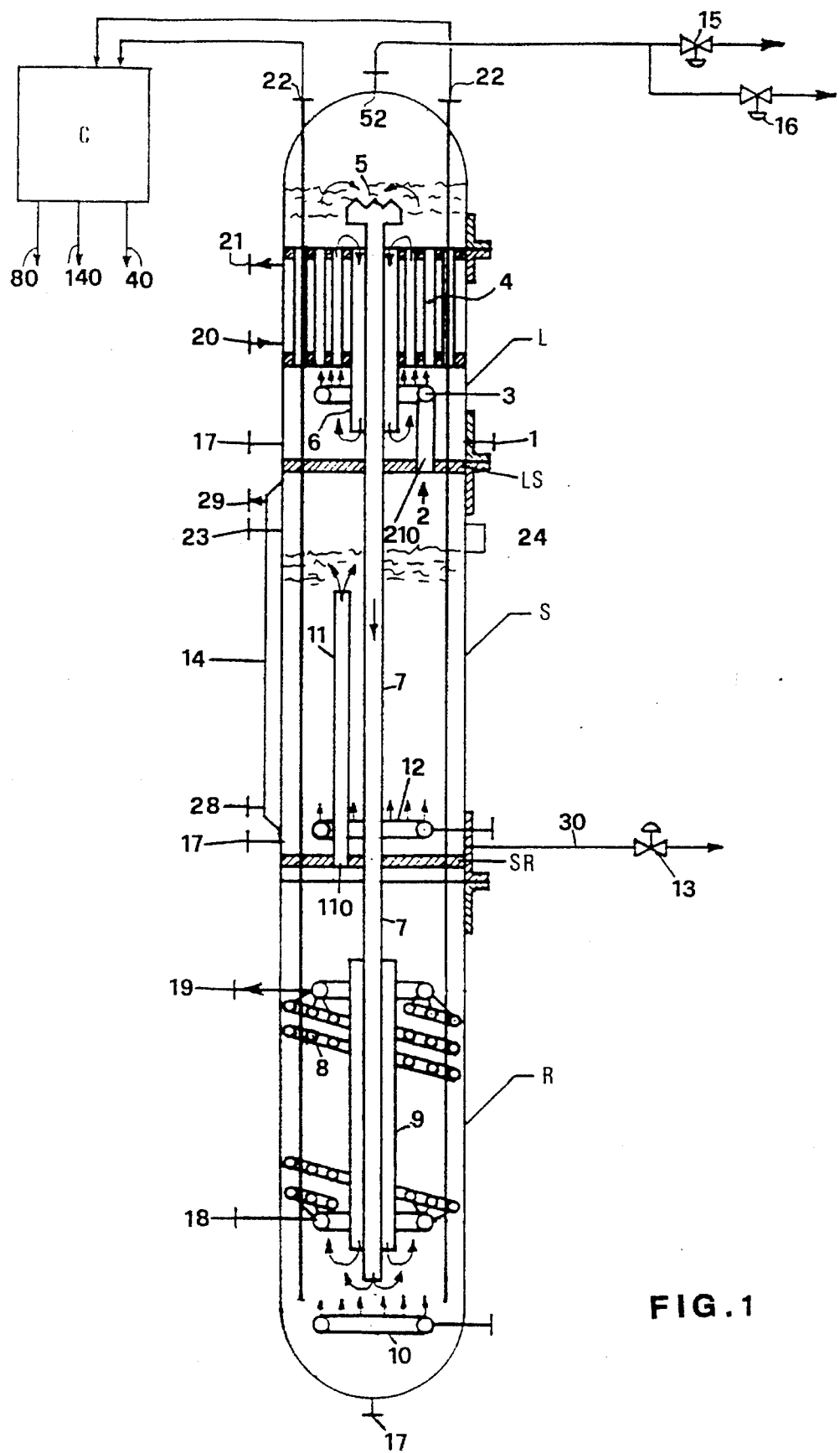
FIG. 1 represents a cross-section and a schematic drawing of the reactor according to the invention.

Within the context of the invention, under the name of reactor are comprised the three parts or sections constituting the pressure vessel having vertical cylindrical shape and marked with the letters L (washing section), S (separating section) and R (reaction section).

The melamine in liquid phase is produced in the reactor under pressures comprised between 5 and 20 MPa and temperatures between 370° and 430° C.

Washing Sector.

This sector of the reactor indicated with L performs the following functions:

removal of the water contained in the molten urea feed pre-heating of the molten urea washing of the raw residual gas recovery of the thermic energy in excess by producing steam under pressure Said top part, or top sector, L of the reactor is provided with a nozzle 1 through which the molten urea is supplied to the top sector of the reactor. The top sector comprises also a distributor 3 having a toroidal shape which distributes the reaction gas 2 coming from the central separation sector S. A heat exchange system comprising a bundle of tubes, e.g., a boiler, indicated with 4, absorbs the heat in excess contained in the reaction gases and the boiler water enters through the nozzle 20 and escapes as steam through the nozzle 21. In the central position there is a pipe 7 for conveying the molten urea from said L sector to the reaction sector R, placed in the bottom part of the reactor.

A pipe 6 co-axial with the pipe 7, causes the circulation of the fluids, so that the contact and the mixing of the reaction gases with the urea occurs in the most efficient way. The lower part of said L sector is formed by the diaphragm LS which separates the top sector from the central sector of the reactor.

The recovered gas is transferred through the nozzle 52 and is extracted through an external pipeline, the opening of which is adjusted through the valves 15 or 16. The process occurring in the top sector L is described as follows. The molten urea at a temperature comprised between 135° and 160° C. is introduced through the nozzle 1 in the washing section L of the reactor and enters into contact with the reaction gases 2 coming from the S section which are transferred through the distributor 3. The heat exchange system removes the heat through the circulation of water outside the tubes which is transformed into steam and adjusts the pre-heating temperature of the molten urea 5 between 200° and 250° C. by acting on the control valve (not represented in the drawing) of the steam pressure.

The circulation of the liquid inside the washing section is granted by the central tube 6.

The molten urea, enriched by the melamine and by a fraction of ammonia and of carbon dioxide contained in the raw reaction gas, passes by gravity through pipe 7 into the reaction sector R wherein the melamine synthesis takes place.

After it has been washed, the reaction gas passes through a liquid separator (not represented in the drawing) positioned at the top of the washing sector and is taken out at a temperature of >200° C., through a valve 15 which controls the operating pressure of the reactor.

Reactor Sector.

The reactor sector indicated with R is the bottom sector of the reactor. It is in this sector that the actual reaction leading to the formation of the melamine occurs. Said sector comprises a central pipe 7 supplying by gravity the molten urea from the washing sector, a heat exchange system 8 supplying the reaction heat, which is fed with a continuous supply of molten salts, let in through nozzle 18 and discharged through nozzle 19, a device 10 for the distribution of gaseous ammonia, connected with an external pipe for the supply of an excess of ammonia to the process, a pipe 9 co-axial with pipe 7 for improving the circulation of the reaction fluids.

The semi-spheric bottom of the reactor is provided with a discharge valve 17.

The bottom sector R is limited at its top by a diaphragm SR which can be removed, if necessary, for assembly and maintenance purposes. In this diaphragm there is an opening 110, which sets this sector R into communication with the central separation sector S through a pipe 11 placed in the central sector S. The endothermic reaction of the melamine synthesis occurs in this part of the reactor at the above-mentioned pressures comprised between 5 and 20 MPa.

The heat needed for the reaction is supplied by the molten salts circulating in the coils (or bayonet-type pipe system) 8, in order to maintain the reaction temperature between 370° and 430° C. The circulation of the fluid is granted by the central pipe 9.

In order to reduce the formation of the deammonisation products melem and melam, liquid ammonia is pumped through two evaporators placed in series (not represented in the drawing) and is fed through the distributor 10 in gaseous phase, at a temperature exceeding 250° C. and preferably at 400° C. nearby the supply pipe 7 in order to secure the optimum mixing.

Separation Sector

The central sector S is the sector wherein the separation of the gaseous products from the liquid phase of the reaction occurs. Said sector is delimited by two diaphragms: the lower diaphragm SR and the upper one LS, and the gravity drop pipe 7 conveying the molten urea from the top washing sector L to the bottom reaction R passes through it.

The central sector S is also provided with a pipe 11 for the inlet of the reaction products coming from the bottom sector and an opening 210 obtained in the diaphragm LS allowing the passage of the reaction gasses in the washing sector.

A distributor 12 lets into the central sector gaseous ammonia and an external jacket 14, wherein molten salts circulate, maintains at constant temperature this sector. Close to the bottom of this sector S there is a discharge pipe 30, through which the produced raw melamine is extracted.

Besides the mentioned functions of separating the gaseous reaction products from the liquid phase, this part of the reactor also has the task of granting the necessary residence time of the raw melamine, in the presence of an excess of ammonia, in order to allow a partial reconversion of the deammonisation byproducts into melamine (Ageing). The reaction products passe through pipe 11 in the sector S, for the separation of the gas and for ageing, into which gaseous ammonia, pre-heated at a temperature exceeding 250° C. is let in through a distributor 12.

The diaphragm positioned between the reaction sector R and the sector S for the separation of the gas and for the ageing of the produced melamine gas is removable for assembly and maintenance purposes.

The level of melamine in the liquid phase is maintained by a level controller 24 acting on valve 13.

A large excursion range of the level of the liquid makes it possible to regulate the residence and ageing time of the product between 20 minutes and more than an hour. The average temperature is regulated in this sector between 360° and 400° C. by the jacket 14 containing melted salts which are let in through nozzle 28 and let out through nozzle 29.

The following remarks can be made about the reactor as a whole.

The pressure of the residual gas cushion which is present in the top sector L is adjusted by means of valve 15 during the normal operating conditions and by means of valve 16 to the stack during the transient phases of start-up and shut-down of the plant.

Each sector of the reactor is equipped with a specific drain 17, in order to allow the recovery of the process liquids when the plant is shut-down and the washing and cleaning of the reactor before inspection and maintenance. Both during the start up and shut-down periods as well as during normal operation at different levels of production, special attention must be paid to the adjustment of the operating temperatures and pressures in the single sectors of the reactor.

The process temperatures are controlled by an electronic unit C which uses the signals of one of two multiple thermocouples 22 installed inside the reactor along its entire height.

Said signals properly elaborated by the control unit C exit as control impulses 40, 140, 80 which act on the steam boiler pressure 4 and on the temperatures/flow rates of the molten salt inlets 18 and 28 respectively.

This simple solution permits easy check ups and adjustments during operation, an easy maintenance and a reliable computerized control of the process.

A nozzle 23 is provided in the central sector S for the purpose of introducing, pre-heated and under pressure, carbon dioxide coming from the compressor of the urea plant, during the start-up and shut-down periods of the plant.

During said periods carbon dioxide is introduced also through the distributors 10 and 12 in order to prevent possible pluggings.

For the same purpose it is also possible to use nitrogen and/or gaseous ammonia, properly pre-heated.

The dimensions of the reactor obviously depend on the plant design capacity and on the operating pressure, which should be chosen within a range of pressures comprised between 10 and 20 MPa in order to maximize the specific advantages of the non-catalytic, high-pressure process and to optimize the process of recovery of the washed off-gas in relation, for instance, to the specific characteristics of the adjacent urea synthesis plant.

The individual size of the three sectors L, S and R forming the reactor must be such as to guarantee the perfect performance of their specific functions and it defines, for instance, the volumes, the exchange surfaces, the residence time of the fluids, the volume for the separation of the gasses, the flow-rates of the circulating fluids, the maximum pressure drops allowed in order to guarantee the regular operation of the reactor, etc. . . . . .

It is important to remark that, in the full respect of the dimensioning criteria and of the above-mentioned constraints, it is possible and advisable to realize the three sectors of the reactor with an identical internal diameter. This is possible by properly choosing the heights of the individual sectors and the type and size of the internal devices and it makes the design, the manufacture of the reactor, its assembly on site and the inspection and maintenance operations simpler and more economical.

However, should there be, for instance, lay-out limitations, this criterion can be abandoned and a different internal diameter of the three sectors can be chosen.

I claim:

1. A reactor for the production of melamine comprising:

a single vessel having an outer wall and being divided in a vertically stacked interconnected arrangement of a top sector, a central sector, and a bottom sector;

a pair of upper and lower spaced apart horizontal diaphragms located within the vessel, the upper diaphragm defining a boundary between the top sector and the central sector and the lower diaphragm defining a boundary between the central sector and the bottom sector, said top, bottom and central sectors respectively facilitating washing from raw off-gas produced by the reaction the melamine ammonia and reactants; reacting urea, ammonia and reactants; and separating melamine from ammonia and reactants;

an inlet in the top sector for introducing molten urea therein;

a pressure regulating and extraction tube in the top sector for extracting ammonia and reactants therefrom and adjusting operating pressure of the vessel;

a top heat exchange means located within the top sector, an inlet and an outlet projecting through the outer wall of the vessel in the top sector in communication with the top heat exchange means for circulating a working fluid therethrough to cool raw off-gas which by direct contact heats the molten urea;

bottom heat exchange means located within the bottom sector;

an inlet and an outlet projecting through the outer wall of the vessel in communication with the bottom heat exchange means for circulating a heated working fluid therethrough for heating the molten urea;

a central heat exchange means located in heat exchange relation with the central sector and including an inlet and an outlet for communicating a working fluid therethrough for maintaining the central sector at a selected temperature;

a first tube running through aligned holes in each of the upper and lower diaphragms for feeding molten urea from the top sector to the bottom sector;

a second tube connected at one end through a hole in the lower diaphragm and projecting upwards from the lower diaphragm for feeding reactants from the bottom sector into the central sector;

a third tube connected at one end through a hole in the upper diaphragm and projecting upwards from the upper diaphragm for distributing reactants from the central sector into the top sector;

a first reactant inlet projecting through the outer wall of the vessel in the lower portion of the bottom sector for introducing ammonia;

a second reactant inlet projecting through the outer wall of the vessel in the lower portion of the central sector for introducing ammonia therein;

an outlet tube projecting through the outer wall of the vessel and a lower portion of the central sector for removing melamine therefrom;

a reactant recovery outlet tube projecting through the outer wall of the vessel in the lower portion of each sector for recovering reactants therefrom;

temperature sensing means for sensing the temperature in each of the respective top, central and bottoms sectors; and means responsive to the temperature sensing means and coupled to the top, central and bottom heat exchange means for regulating the temperature of each sector.

2. The reactor of claim 1 wherein the vessel is a cylinder and each sector has the same diameter.

3. The reactor of claim 1 wherein the third tube connecting the top and bottom sectors has a longitudinal axis coinciding with a longitudinal axis of the vessel.

4. The reactor of claim 1 wherein said diaphragms are removable from the vessel.

5. The reactor of claim 1 wherein the temperature sensor means comprises at least one thermocouple for each sector for sensing the temperature therein.

6. The reactor of claim 1 wherein the temperature control means comprises an electronic control unit, and valve means responsive thereto coupled to the respective top, central and lower heat exchange means for controlling the opening and closing of the valves and the consequent flow of working fluid to each of said respective heat exchange means.

7. A reactor for the production of melamine comprising:

a single vertical vessel including upper and lower sections and an intermediate interconnected central section;

a pair of upper and lower spaced apart diaphragms located within the vessel, the upper diaphragm defining a boundary between the upper and central section and the lower diaphragm defining a boundary between the central and lower section, each diaphragm having a pair of holes formed therein, and at least one of said holes in each diaphragm being in axial spaced apart alignment;

a first tube extending from the upper section to the lower section through the axially aligned holes for interconnecting said sections;

a second tube located in the second hole of the lower diaphragm and extending therefrom into the central section for establishing communication between the lower section and the central section;

a third tube formed located in the second hole of the upper diaphragm extending upwardly into the upper section for establishing communication between the central section and the upper section;

each section further including a respective lower distributor, central distributor and upper distributor located in a corresponding lower portion of each corresponding section;

said upper distributor being coupled to the third tube in flow communication therewith, and inlet means coupled through the vessel to each of the lower and central distributors;

a lower heat exchanger located in the lower section coaxially with the first tube;

an upper heat exchanger located in the upper section coaxially with the first tube;

inlet and outlet means formed in the vessel for each of the lower and upper heat exchangers for circulating a working fluid therethrough;

a central heat exchanger located in heat exchange relation with the central section having inlets and outlets for the passage of a working fluid therethrough;

temperature sensor means for each of the upper, central and lower sections; and means responsive to the temperature sensors for regulating the temperature of the working fluid and the corresponding temperature of each section.

8. The reactor according to claim 7 further including upper and lower circulation means comprising a tube in each of the respective upper and lower sections being coaxial with the first tube and located at least partially within the corresponding upper and lower heat exchanger.

9. The reactor according to claim 1 further including upper and lower circulation means comprising a tube in each of the respective upper and lower sections being coaxial with the first tube and located at least partially within the corresponding upper and lower heat exchanger.

* * * * *